(12) United States Patent
Koo (10) Patent No.: US 7,508,802 B2
(45) Date of Patent: Mar. 24, 2009

(54) METHOD OF CONTROLLING WIRELESS LOCAL NETWORK MEDIUM ACCESS USING PSEUDO-TIME DIVISION MULTIPLEXING

(75) Inventor: Ki Jong Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 726 days.

(21) Appl. No.: 11/128,936

(22) Filed: May 12, 2005

(65) Prior Publication Data

US 2006/0104248 A1  May 18, 2006

(30) Foreign Application Priority Data

Nov. 17, 2004  (KR) .................... 10-2004-0094254

(51) Int. Cl.
*H04W 4/00* (2006.01)
*H04W 72/00* (2006.01)
*H04B 7/212* (2006.01)
*H04L 12/413* (2006.01)
*H04J 3/16* (2006.01)
*H04J 3/24* (2006.01)
*H04J 14/08* (2006.01)

(52) U.S. Cl. .................. 370/338; 370/445; 370/443; 370/346; 370/347; 370/349; 455/452.2; 398/99

(58) Field of Classification Search ................ 370/338, 370/445, 443, 346, 347, 349; 455/452.2; 398/99
See application file for complete search history.

(56) References Cited

U.S. PATENT DOCUMENTS

| | | | |
|---|---|---|---|
| 5,793,767 A * | 8/1998 | Soda et al. .................. 370/397 |
| 6,522,650 B1 * | 2/2003 | Yonge et al. ................. 370/390 |
| 6,556,582 B1 * | 4/2003 | Redi ........................... 370/443 |
| 6,747,968 B1 | 6/2004 | Seppala et al. |
| 2001/0043618 A1 * | 11/2001 | Chien et al. .................. 370/498 |
| 2002/0150095 A1 * | 10/2002 | Sherman ...................... 370/389 |
| 2002/0163933 A1 * | 11/2002 | Benveniste .................. 370/465 |
| 2003/0048770 A1 * | 3/2003 | Proctor, Jr. .................. 370/349 |
| 2003/0117984 A1 * | 6/2003 | Gavette ....................... 370/338 |
| 2003/0169763 A1 * | 9/2003 | Choi et al. ................... 370/462 |
| 2003/0174665 A1 | 9/2003 | Benveniste |
| 2004/0066763 A1 | 4/2004 | Hashimoto et al. |
| 2004/0081133 A1 | 4/2004 | Smavatkul et al. |
| 2005/0053037 A1 * | 3/2005 | Ginzburg et al. ............. 370/333 |
| 2005/0180444 A1 * | 8/2005 | Gu et al. ...................... 370/412 |

* cited by examiner

*Primary Examiner*—Vincent P Harper
*Assistant Examiner*—Ariel Balaoing
(74) *Attorney, Agent, or Firm*—Blakely, Sokoloff, Taylor & Zafman LLP (57) ABSTRACT

The present invention provides a method of controlling Wireless LAN (WLAN) medium access using Pseudo-Time Division Multiplexing (PTDM) to improve the Quality of Service (QoS) of the WLAN. The method includes the first step of a Mobile Terminal (MT) acquiring QoS information, which relates to a voice frame to be transmitted, from an upper layer; the second step of the MT exchanging a frame, including the QoS information, with the AP and being allocated QoS slot (QSLOT) information by the AP; the third step of dividing an RF link section between the MT and the AP by the creation period of the voice frame; and the fourth step of transmitting the voice frame in the creation period of the voice frame using the allocated QSLOT information.

16 Claims, 6 Drawing Sheets

METHOD OF CONTROLLING WIRELESS LOCAL NETWORK MEDIUM ACCESS USING PSEUDO-TIME DIVISION MULTIPLEXING

RELATED APPLICATIONS

The present application is based on, and claims priority from, Korean Application Number 2004-0094254, filed Nov. 17, 2004, the disclosure of which is incorporated by reference herein in its entirety.

BACKGROUND OF THE INVENTION

1. Field of the Invention

The present invention relates generally to a method of controlling wireless local area network medium access and, more particularly, to a method of controlling wireless local area network medium access using pseudo-time division multiplexing to improve the quality of service of Voice over Internet Protocol.

2. Description of the Prior Art

In general, a Wireless Local Area Network (WLAN) operates within 100 m in a transmission rate range of 10 to 100 Mbps. A WLAN composed of a single cell can be used in a single floor office or store. A WLAN terminal is connected to another terminal and an Access Point (AP) on a network via a Radio Frequency (RF) link using a wireless Network Interface Card (NIC).

An AP enables a WLAN terminal to access a wired network via a backbone network. Approximately 25 terminals are connected to a single cell. A multiple cell can be constructed using a plurality of APs that are connected to a wired network, and a WLAN environment can be built throughout the entire building using the multiple cell.

WLAN-related Institute of Electrical and Electronics Engineers (IEEE) standards are described below.

The IEEE developed a standard that defines a protocol regarding the transmission of a data frame between a WLAN terminal and an AP and, as a result, establishes a standard regarding Medium Access Control (MAC) and a Physical (PHY) layer (IEEE Std. 802.11, IEEE standard for Wireless LAN Medium Access Control (MAC) and Physical Layer (PHY), 1999).

The IEEE 802.11 WLAN standard describes a mobile terminal and a fixed AP that are the two principal elements of a WLAN. A single cell using the IEEE 802.11 WLAN standard is defined as a Basic Service Set (BSS), and a multiple cell is defined as an Extended Service Set (ESS).

In the IEEE 802.11 WLAN standard, each terminal and each AP implements a MAC layer having a function capable of a MAC frame. The MAC frame is used as a medium for transmitting control and management data.

The IEEE 802.11 WLAN standard defines two different wireless medium access methods in the MAC layer: a Distributed Coordination Function (DCF) and a Point Coordination Function (PCF).

In the DCF, all the stations can participate in contention for the transmission of a frame. The basic access method of the 802.11 MAC is Carrier Sense Multiple Access with Collision Avoidance (CSMA/CA). In CSMA/CA, a station that intends to transmit data to the wireless medium of a WLAN detects a medium to determine whether data transmission from some other station exists. If the medium is unoccupied, data transmission is performed; otherwise data transmission is delayed until ongoing data transmission is completed.

If data transmission from the station can be performed immediately after previous data transmission has been completed, transmission attempts from a plurality of stations may occur and, therefore, there is a high probability of data collision. In order to solve the problem, after a certain pause period is provided after the completion of data transmission, the size of a Contention Window (CW) is determined by performing binary random backoff, and a station that has the smallest determined CW size is provided with an opportunity to perform transmission. This process is called a Collision Avoidance (CA) function.

Meanwhile, in the PCF, a Point Coordinator (PC) controls transmission from WLAN terminals. The PC functions as a polling master, and polls all the PCF polling-capable terminals to determine the terminal that can perform data transmission. The PC may exist in the AP. In the PCF, a terminal may be capable of polling or not.

If a polling-capable terminal receives a poll from the PC, only a single MAC Protocol Data Unit (MPDU) can perform transmission. When additional transmission is required, waiting must be performed until a poll is received again. If specific data transmission is abnormally performed, a terminal may not retransmit until it receives a poll from the PC. Accordingly, the PCF provides a contention free mechanism to provide an opportunity for a terminal to normally transmit data.

Another wireless medium access method, that is, an Enhanced-DCF (EDCF) that conforms to IEEE 802.11e, intends to improve Quality of Service (QoS) by adjusting a CW. During a CW period, a plurality of stations contends for network access. In order to avoid a collision, a MAC protocol requests individual stations to wait for the CW period that is determined by binary random backoff. A probability of collision between stations is reduced due to the CW period that is determined by the binary random backoff. In this case, the EDCF employs the CW to grant higher priority to a specific station. Higher priority is granted to the specific station by providing a short CW to the specific station. As a result, in most cases, a higher priority station transmits data earlier than a lower priority station.

QoS is a measurement of service quality for a user. Principal measurements of QoS include message loss, message delay and network availability. The transmission of time-sensitive data application traffic (such as voice or video) on a packet network requires conditions that satisfy delay, delay jitter and error rate requirements.

When the wireless medium access methods DCF, PCF and EDCF are examined in terms of QoS, the DCF causes frame delay because it performs binary random backoff before the transmission of a frame, the EDCA supplementing the DCF can grant priority by providing a voice frame with a CW shorter than that which is provided to a data frame but causes frame delay because it still performs backoff, and the PCF causes frame delay because a WLAN terminal can transmit a frame only through polling during a contention free period.

In the meantime, U.S. Pat. No. 6,747,968 B1 entitled "Method and system for weighted PCK polling lists for WLAN QoS support" discloses a method and system for providing weights when an AP polls terminals on a WLAN. U.S. Pat Publ. No. 2004/0081133 A1 entitled "Method of communication device initiated frame exchange" discloses a method for accessing a WLAN channel and providing QoS for voice in a system supporting both voice and data services. However, the preceding patents are problematic in that they have limitations in ensuring a sufficient bandwidth for an RF link due to the performance of polling and transmission delay time is excessively long due to channel contention and polling.

SUMMARY OF THE INVENTION

The present invention provides a method of controlling WLAN medium access using PTDM, which is capable of improving QoS by reducing transmission delay without performing backoff and polling when the voice frame of an RF link section is transmitted in a VoIP system having a WLAN function.

The present invention provides a method of controlling WLAN medium access using PTDM to improve the QoS of a VoIP system to which a WLAN, which includes a BSS having a plurality of Mobile Terminals (MTs) and an Access Point (AP) that are connected via an RF link, is applied, including the first step of a Mobile Terminal (MT) acquiring QoS information, which relates to a voice frame to be transmitted, from an upper layer; the second step of the MT exchanging a frame, including the QoS information, with the AP and being allocated QoS slot (QSLOT) information by the AP; the third step of dividing an RF link section between the MT and the AP by the creation period of the voice frame; and the fourth step of transmitting the voice frame in the creation period of the voice frame using the allocated QSLOT information.

The method may further include the steps of the MT waiting for reception of an ACK from the AP after an SIFS; and terminating the transmission of the voice frame if the MT receives the ACK from the AP, and retransmitting the voice frame through contention in a CP after an CFP if the MT does not receive the ACK from the AP.

The present invention provides a method of controlling WLAN medium access using PTDM to improve the QoS of Voice over Internet Protocol. In a PTDM scheme, an RF link is divided to correspond to the creation period of a voice frame, and a QoS slot (QSLOT) is allocated to an MT in each period, thus allowing the MT to transmit a voice frame. The QSLOT includes a voice frame, an acknowledgement (ACK), and an Inter-Frame-Space (IFS). In the QSLOT, only a corresponding MT can transmit a voice frame without contention. As described above, in accordance with the present invention, a voice frame can be transmitted at the scheduled time, so that QoS can be improved in an RF link section by reducing frame delay and jitter.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 1:
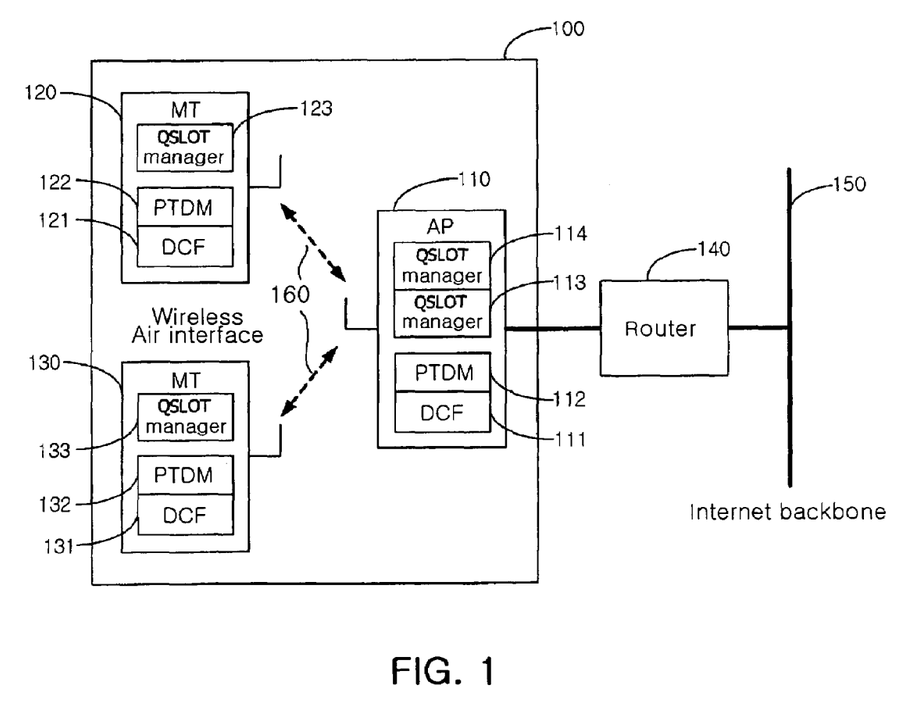
FIG. 1 is a configuration diagram of a WLAN system that performs a QoS function on a voice frame in an RF link section in accordance with an embodiment of the present invention.
Figure 2:
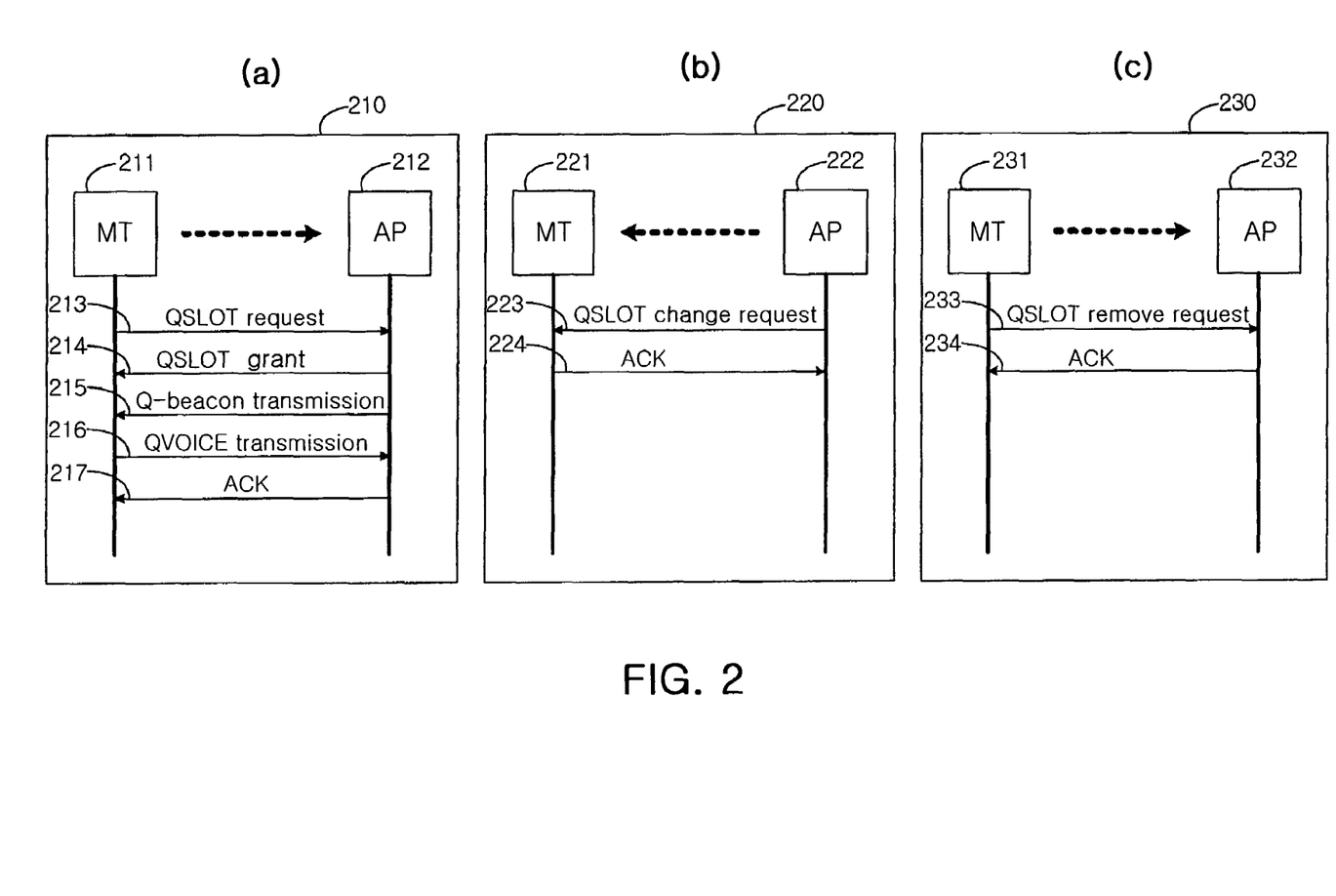
FIGS. 2a to 2c are diagrams showing processes of exchanging QoS frames to manage a QSLOT in accordance with the present invention.

FIG. 1 is a configuration diagram of a WLAN system that performs a QoS function on a voice frame in an RF link section in accordance with an embodiment of the present invention. FIG. 1 schematically illustrates an example of the WLAN system according to the present invention. Those skilled in the art can understand that other elements are included in the WLAN system.

Referring to FIG. 1, a BSS 100 includes a plurality of Mobile Terminals (MTs) 120 and 130 and a single AP 110, and constitutes a WLAN. The MTs 120 and 130 are connected to the AP 100 via an RF link. The WLAN is connected to an Internet Backbone (IB) 150 via an Internet Protocol (IP) router 140. In this case, data is transmitted via an upstream path extending from the MTs 120 and 130 through the AP 110 to the IB 150 and via a downstream path extending from the IB 150 through the AP 110 to the MTs 120 and 130. The MTs 120 and 130 and the AP 110 employ DCF modules 111, 121 and 131 conforming to the IEEE 802.11-1999 standard and PTDM modules 112, 122 and 131 conforming to the present invention. The MTs 120 and 130 existing in the BSS 100 are equipped with voice codecs having the same creation period of a frame.

The MTs 120 and 130 possess QSLOT managers 123 and 133, respectively, and manage information on the creation period of a voice frame and QSLOT information. The AP 110 possesses a QSLOT manager 114 and a QSLOT list 113, and manages the QSLOTs of the MTs 120 and 130 that are connected to the AP 110.

In FIG. 1, the MTs 120 and 130 exchange frames, including QoS information, with the AP 110 before the transmission of a voice frame, are assigned QSLOTs through which voice frames can be transmitted, and then transmits the voice frames. The frame exchange process and the transmission of a voice frame using a QSLOT are described with reference to FIG. 2 and FIGS. 4, 5 and 6, respectively.

FIGS. 2a to 2c are diagrams showing processes of exchanging QoS frames to manage a QSLOT in accordance with the present invention. As shown in FIGS. 2a to 2c, a QSLOT management mode according to the present invention includes QSLOT setting 210 shown in FIG. 2a, QSLOT change 220 shown in FIG. 2b, and QSLOT removal shown in FIG. 2c.

With reference to FIG. 2a, a QoS frame exchange process for the QSLOT setting 210 according to the present invention is described. Referring to FIG. 2a, when there is a voice frame to be transmitted, the MT 211 transmits a QSLOT Request To Send (QRTS) frame to the AP 212 at step 213. The AP 212, having received the QRTS frame, transmits a QSLOT Grant To Send (QGTS) frame, including a QSLOT Number (QN) 332 (shown in FIG. 3), to the MT 211 according to a set QSLOT list 113 at step 214. In this case, the QN is the unique number of a QSLOT that is assigned to the MT 211. The MT 211, having been assigned the QN 316 by the AP 212, waits for the reception of a QoS beacon (Q-beacon) from the AP 212, and extracts QSLOT information from the Q-beacon and transmits the voice frame to the AP 212 in a corresponding QSLOT when the Q-beacon 215 is received from the AP 212 at step 215, at step 216. The AP 212, having received the voice frame from the MT 211, terminates the frame exchange by transmitting an ACK frame at step 217. The transmission of the voice frame in the QSLOT is described in detail with reference to FIG. 4.

With reference to FIG. 2b, a QoS frame exchange process for the QSLOT change 220 according to the present invention is described. Referring to FIG. 2b, when the AP 222 intends to change the QN of the MT 221 to keep the QSLOT list 113 minimized, the AP 222 transmits a QSLOT Change Request To Send (QCRTS) frame to the MT 221 at step 223. The MT 221, having received the QCRTS frame, updates the QN and transmits an ACK to the AP 222 at step 224.

With reference to FIG. 2c, a QoS frame exchange process for the QSLOT removal 230 according to the present invention is described. Referring to FIG. 2c, after completing the transmission of the voice frame, the MT 231 transmits a QSLOT Remove Request To Send (QRRTS) frame, which is used to remove the QN from the QSLOT list 113 that is located in the AP 232, to the AP 232 at step 233. The AP 233, having received the QRRTS frame, removes the QSLOT list of the MT from the QSLOT list 113 and then transmits an ACK to the MT 231 at step 234.

Figure 3:
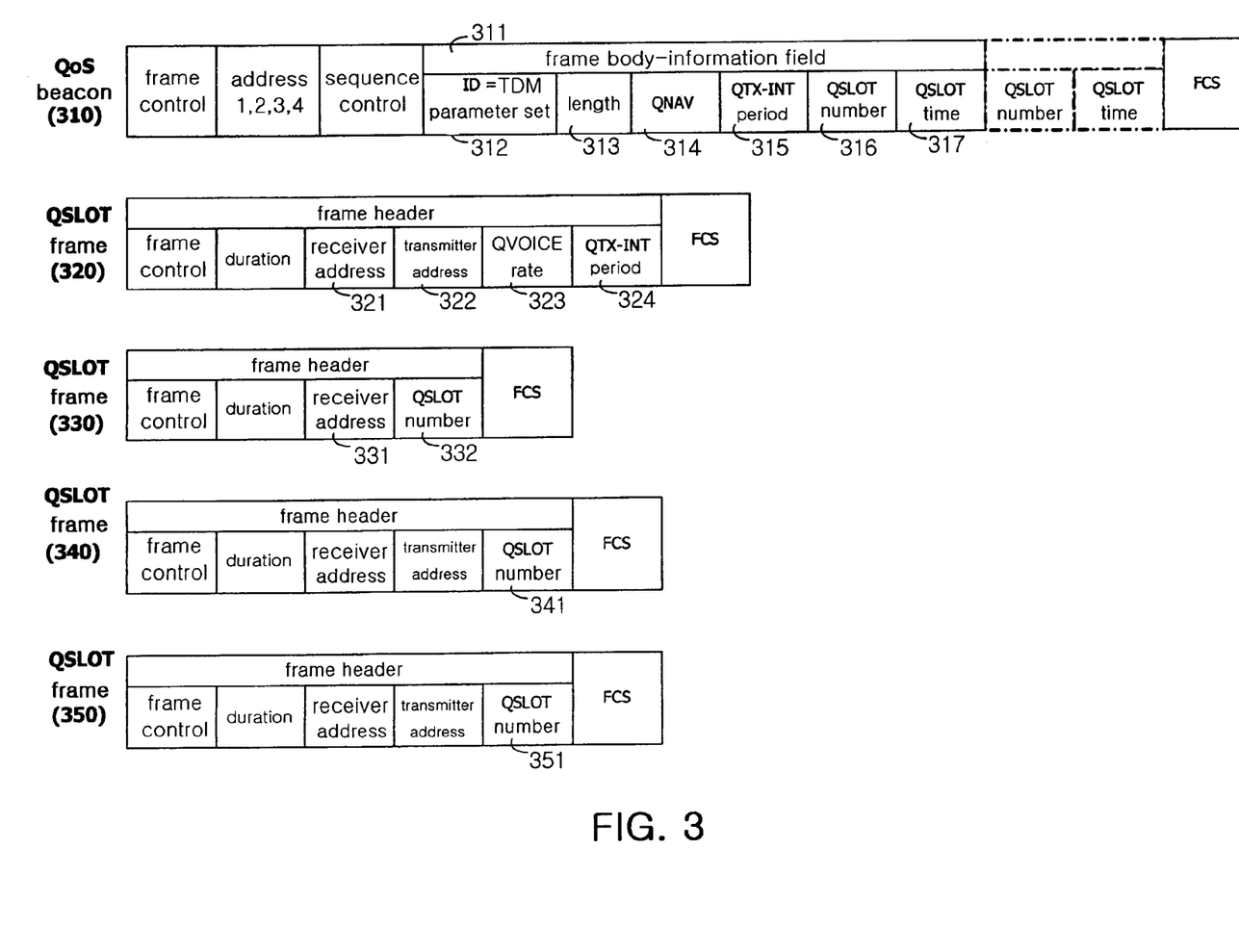
FIG. 3 is a diagram showing the formats of frames that are used to perform the QoS frame exchange processes according to an embodiment of the present invention.

FIG. 3 is a diagram showing the formats of frames that are used to perform the QoS frame exchange processes according to an embodiment of the present invention. Referring to FIG. 3, a QoS beacon (Q-beacon) 310 includes a beacon frame, which is used for IEEE 802.11, and an additional information field 311. The information field 311 includes an identifier (ID), a data length (LENGTH) 313, a QSLOT Network Allocation Vector (QNAV) 314, a QoS Frame Transmission Interval (QTX-INT) 315, a QSLOT number (QSLOT NUMBER: QN) 316 and a QSLOT time (QSLOT TIME: QT) 317. In this case, the ID 312 is allocated to TDM parameter setting (TDM PARAMETER SET). The LENGTH 313 indicates the length of the information field 311 on a bit basis. The QNAV 314 indicates the length of a Contention Free Period (CFP). The QTX-INT 315 indicates the creation period of a voice frame. The QN 316 is an identification number that is allocated to an MT. The QT 317 starts from one and increases in proportion to the number of MTs that have requested QSLOTs. The QT 317 is the length of QSLOTs that corresponds to the QN 316. When a plurality of MTs have requested QSLOTs from the AP, the QN 316 and the QT 317 exist, the number of each of which corresponds to the number of MTs.

A QSLOT REQUEST TO SEND (QRTS) frame 320 is used when the MT requests a QSLOT. In this case, a receiver address 321 is the AP, and a transmitter address 322 is the MT that requests the QSLOT. A QVOICE RATE 323 is transmission rate information that is used when the MT transmits a voice frame. The AP calculates the QT 317 using the QVOICE RATE. The QTX-INT 324 indicates the creation period of the voice frame of the MT.

A QSLOT GRANT TO SEND (QGTS) frame 330 is used when the AP allocates the QN to the MT. The receiver address 331 is the MT that transmits the QRTS frame. The QN 332 is a Q slot ID number that the MT, having requested the QSLOT, can use.

A QSLOT CHANGE REQUEST TO SEND (QGRTS) frame 340 is used when the AP changes the QN of the MT that is connected thereto. The AP updates the QSLOT list to keep the length of the QNAV minimized. In order to update the QSLOT list, the change of the QN of the MT may be requested. In this case, the QN 342 to be changed is inserted into the QCRTS frame 340 and transmitted to a corresponding MT. The MT, having received the QCRTS frame 340, updates the QN.

A QSLOT REMOVE REQUEST TO SEND (QRRTS) frame 350 is used when the MT requests that the QN of the MT should be removed from the QSLOT list of the AP after completing the transmission of a voice frame. The QN 351 is the QSLOT ID number that the MT is currently using.

Figure 4:
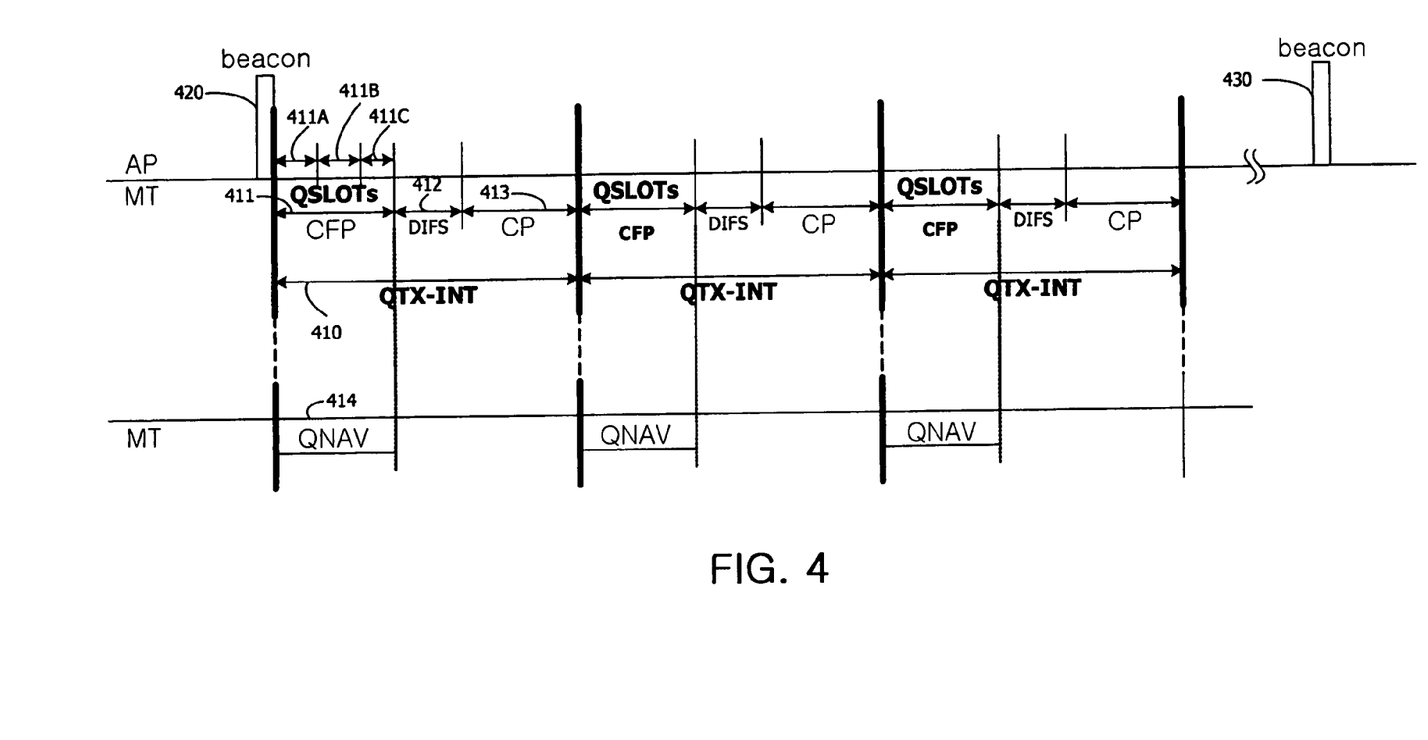
FIG. 4 is a diagram showing the division of an RF link 160 according to the creating period of a voice frame in accordance with an embodiment of the present invention.

FIG. 4 is a diagram showing the division of an RF link 160 according to the creation period of a voice frame in accordance with an embodiment of the present invention. Referring to FIG. 4, the QTX-INT 410 is the time that divides two Q-beacons 420 and 430 according to the creation period of a QoS voice (QVOICE) frame (e.g., 160 bytes per 20 ms). Each QTX-INT 410 includes a CFP 411 and a Contention Period (CP) 413, and the CFP 411 includes one or more QSLOTs 411A, 411B and 411C. After the CFP 411, a DCF Inter Frame Space (DIFS) 412, that is, the time interval between frames that is used in the DCF, is waited for, and the CP 413 is then entered. Every MT suppresses the transmission of a frame by setting a QNAV 414 for a CFP. However, the MT, having been allocated a QSLOT, can transmit a voice frame in the QSLOT.

Figure 5:
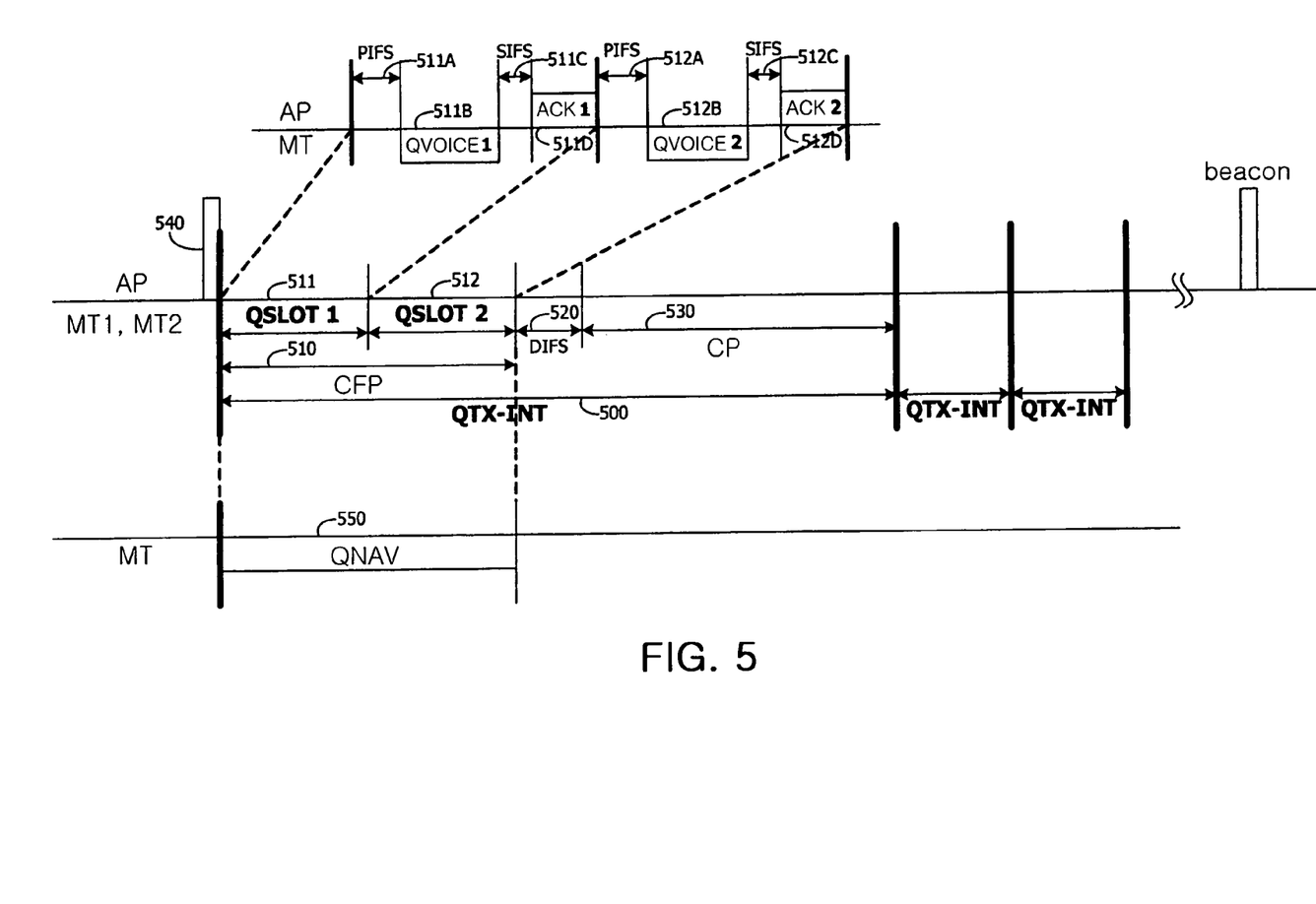
FIG. 5 is a diagram showing a process of transmitting a voice frame using a QSLOT in the creation period of a voice frame based on PTDM in accordance with an embodiment of the present invention.

FIG. 5 is a diagram showing a process of transmitting a voice frame using a QSLOT in a QTX-INT based on the PTDM in accordance with an embodiment of the present invention. Referring to FIG. 5, MT1 and MT2 intending to transmit voice frames request QNs by transmitting QRTS frames to the AP. The AP, having received the QRTS frames 1 and 2, allocates QSLOT 1 511 and QSLOT 2 512 to the MT1 and the MT2, respectively. The MT1 and the MT2, having been allocated the QNs, wait for the reception of Q-beacons 540. The information field of each Q-beacon 540 includes a QN and QT that correspond to the MT1 or MT2. QSLOTs are created in the order of QSLOT 1, QSLOT 2, QSLOT 3, . . . , with the QN increasing from one by one on the basis of the Q-beacon.

When the Q-beacon 540 is received, every MT extracts a QNAV 550 and sets the length of a CFP 510, the MT1 and the MT2 prepare for the transmission of voice frames in corresponding QSLOTs 511 and 512, and the remaining MTs defer the transmission of frames.

Since the MT1 has a QN of one, the MT1 waits for a PIFS 511A, which is the time interval between frames that is used in the PCF, after completing the reception of the Q-beacon. If the RF link 160 is idle after the PIFS, the MT1 transmits a voice frame QVOICE 1 511B. The AP, having normally received the QVOICE 1, transmits an ACK1 511D and terminates the QSLOT 1 after the SIFS 512C.

After the QSLOTs are all terminated (that is, the CFPs are terminated) and the DIFS 520 is waited for, an AP and MTs within the same BBS can transmit frames through contention in the CP 530 under the DCF. In the CP, all the MTs and the AP check the remaining time of the QTX-INT before the transmission of frames, and defer the transmission of frames to the next CP if the time required for the exchange of frames is longer than the remaining time of the QTX-INT.

Figure 6:
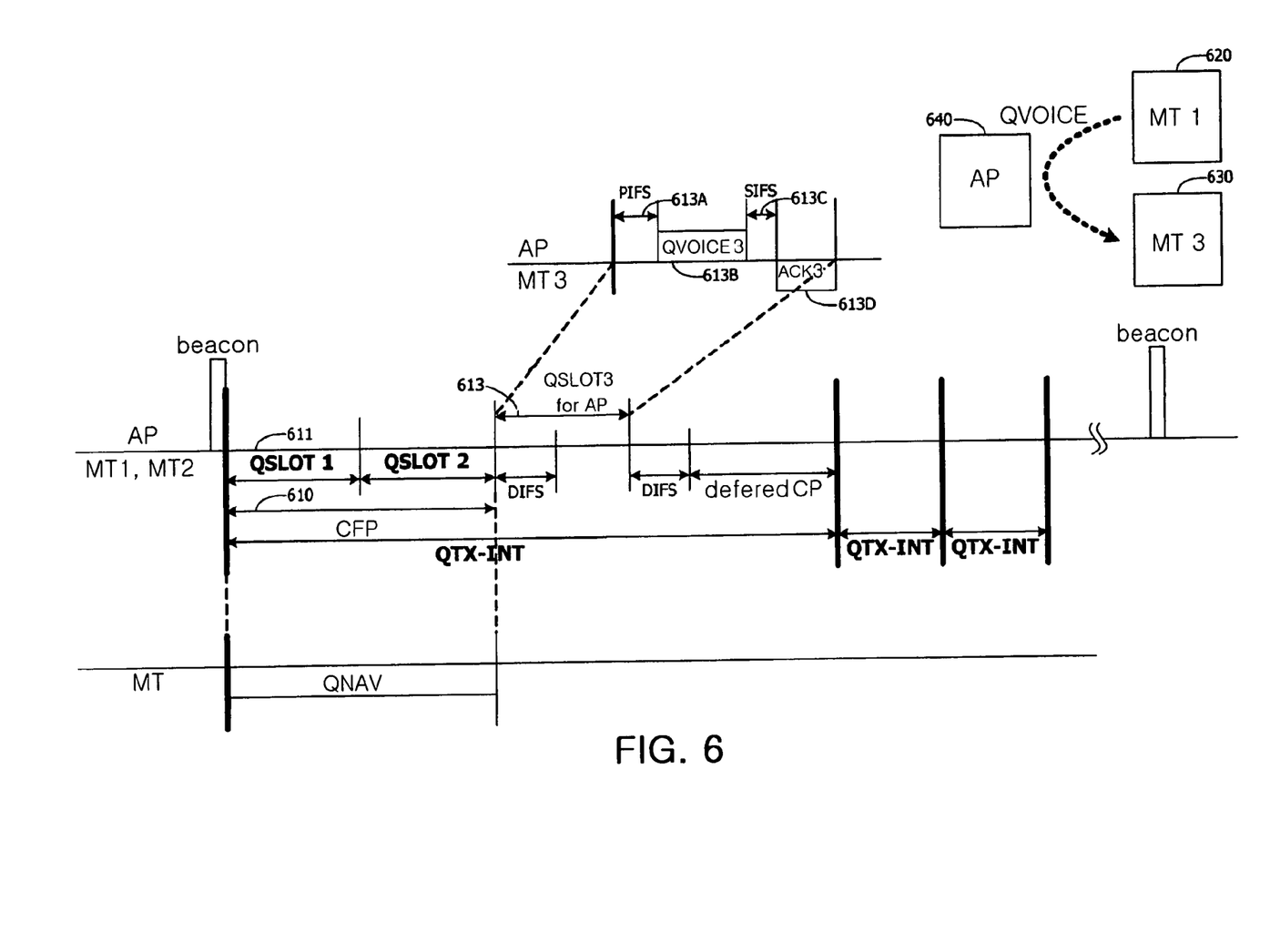
FIG. 6 is a diagram showing a process in which an AP transmits a voice frame between the WLAN terminals of the same BSS.

FIG. 6 is a diagram showing a process in which an AP transmits a voice frame from MT1 to MT3 (the MT1 and the MT3 pertain to the same BSS). Referring to FIG. 6, when the QVOICE frame is transmitted from the MT1 to the MT2 (the MT1 and MT2 pertain to the same BSS), the AP stores the QVOICE 1 received from the QSLOT1 611, waits for the PIFS 613A after the CFP 610 has been terminated, and then transmits the QVOICE3 613B (QVOICE1 frame transferred from the MT1 to the MT2) to the MT3. The MT3 normally receives the QVOICE3 and then transmits ACK3 613D after the SIFS 613C, thus completing the frame exchange process. If the AP does not transfer a QVOICE frame any further, a DIFS is waited for and a delayed CP then begins. For the MT1 and the MT2, frames can be transmitted after a CFP and a DIFS, so that the AP that waits only for a PIFS acquires the right to use the RF link.

In the meantime, the above-described embodiments may be written in the form of a computer program that can be executed on a computer, and can be implemented in a general-purpose digital computer using a computer-readable storage medium.

The methods according to the present invention may be implemented on computer-readable storage media in the form of computer-readable code. The computer-readable storage media include all types of storage media in which computer system-readable data are stored. Although examples of the computer readable storage media are Read-Only Memory (ROM), Random Access Memory (RAM), Compact Disk (CD)-ROM, a magnetic tape, a floppy disk, and an optical data storage, the methods according to the present invention can be implemented in the form of transmission via the Internet. Furthermore, the computer-readable storage media are distributed throughout a computer system connected via a network, and code, which can be read by a computer in a distributed manner, can be stored and executed.

In accordance with the present invention, an RF link is divided according to the creation period of a voice frame using PTDM, a QSLOT is provided to each MT in each period and a voice frame is transmitted via the QSLOT, so that the voice frame can be transmitted without contention in the QSLOT, and the QoS of an RF link section can be improved due to the decrease in frame transmission time and jitter because the voice frame is transmitted in a scheduled time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling Wireless Local Area Network (WLAN) medium access using Pseudo-Time Division Multiplexing (PTDM) to improve Quality of Service (QoS) of a Voice over Internet Protocol system to which a WLAN, which includes a Basic Service Set (BSS) having a plurality of Mobile Terminals (MTs) and an Access Point (AP) that are connected via a Radio Frequency (RF) link, is applied, comprising:

the first step of a Mobile Terminal (MT) acquiring QoS information, which relates to a voice frame to be transmitted, from an upper layer;

the second step of the MT exchanging a frame for a request to transmit the voice frame during a contention free period, including the QoS information, with the AP and being allocated QoS slot (QSLOT) information by the AP in response to the request by the MT during the contention free period;

the third step of dividing an RF link section between the MT and the AP by a creation period of the voice frame (QoS frame transmission interval: QTX-INT), wherein the creation period includes a DCF Inter Frame Space before entering a contention period;

the fourth step of transmitting the voice frame in the divided creation period of the voice frame using the allocated QSLOT information; and after the voice frame is transmitted, each of the plurality of MTs and the AP determining a remaining time in the creation period that is assigned to the contention period after the DCF Inter Frame Space and deferring transmission of an additional voice frame when a time required for an exchange of the additional voice frame is greater than the remaining time in the creation period after the DCF Inter Frame Space.

2. The method according to claim 1, wherein the first step comprises the step of the MT receiving the creation period of the voice frame to be transmitted from the upper layer.

3. The method according to claim 1, wherein the second step comprises the steps of:

the MT transmitting a QSLOT REQUEST TO SEND (QRTS) frame to the AP;

the AP transmitting a QSLOT GRANT TO SEND (QGTS) frame to the MT;

the MT extracting a QSLOT NUMBER (QN) from the transmitted QGTS frame; and the MT receiving a QoS beacon (Q-beacon) from the AP, and extracting the QSLOT information by checking a QN of the Q-beacon that corresponds to the extracted QN.

4. The method according to claim 3, wherein the QRTS frame comprises a transmission rate of the voice frame and the creation period of the voice frame.

5. The method according to claim 3, wherein the QGTS frame comprises the QN that is allocated to the MT.

6. The method according to claim 3, wherein the Q-beacon comprises information about a length of a Contention Free Period (CFP), the QTX-INT of the voice frame, and the QN and QT of the MT that is allocated the QSLOT.

7. The method according to claim 1, wherein the third step is performed in such a way as to divide the RF link section between two Q-beacons by an interval having a same time period as the creation period of the voice frame.

8. The method according to claim 7, wherein the interval having the same time period comprises a Contention Free Period (CFP) and a Contention Period (CP).

9. The method according to claim 8, wherein the CFP is divided by the QSLOT into intervals whose number is identical to the number of MTs that are allocated QSLOTS.

10. The method according to claim 1, wherein the QSLOT comprises an acknowledgement (ACK) frame, a PIFS and an SIFS.

11. The method according to claim 1 or 10, wherein the QSLOT is a period in which the MT and the AP can transmits a frame without contention.

12. The method according to claim 1, wherein the fourth step is performed in such a way that the MT having the voice frame to be transmitted transmits the voice frame after waiting for a PIFS from a start point.

13. The method according to claim 1, further comprising the steps of:

the MT waiting for reception of an ACK from the AP after an SIFS; and terminating the transmission of the voice frame if the MT receives the ACK from the AP, and retransmitting the voice frame through contention in a CP after an CFP if the MT does not receive the ACK from the AP.

14. The method according to claim 1, wherein the fourth step comprises the steps of:

an MT, not having been allocated the QSLOT, extracting a QNAV from a Q-beacon; and suppressing the transmission of the voice frame by setting the extracted QNAV in the creation period of the voice frame.

15. The method according to claim 1, wherein the fourth step comprises the steps of:

the AP transmitting the voice frame after a CFP and a PIFS when the voice frame is transmitted from a first MT to a second MT within the same creation period of the voice frame in the BSS; and completing the transmission of the voice frame by receiving an ACK frame from the second MT after an SIFS.

16. The method according to claim 1, wherein the MT manages information about the creation period of the voice frame and QSLOT information and the AP manages QSLOTs of MTs connected to the AP.

* * * * *